United States Patent
Angerer et al.

(10) Patent No.: US 7,216,732 B2
(45) Date of Patent: May 15, 2007

(54) SHAFT DRIVE UNIT, IN PARTICULAR AN ELECTRICAL DRIVE UNIT FOR DRIVING A WHEEL SHAFT WITH A TRANSVERSE SHAFT STRUCTURE

(75) Inventors: Wolfram Angerer, Heidenheim (DE); Uwe Muhlberger, Heidenheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/030,530

(22) PCT Filed: Apr. 24, 2001

(86) PCT No.: PCT/EP01/04586

§ 371 (c)(1),
(2), (4) Date: Apr. 15, 2002

(87) PCT Pub. No.: WO01/86782

PCT Pub. Date: Nov. 15, 2001

(65) Prior Publication Data

US 2002/0175008 A1    Nov. 28, 2002

(30) Foreign Application Priority Data

May 9, 2000    (DE) .................................. 10022319

(51) Int. Cl.
B60K 6/02    (2006.01)
(52) U.S. Cl. .................................................. 180/65.6
(58) Field of Classification Search ............... 180/65.1, 180/65.2, 65.5, 65.6, 65.8; 310/68 R, 72, 310/68 D
See application file for complete search history.

(56) References Cited

U.S. PATENT DOCUMENTS 3,885,175 A * 5/1975 Palloch ..................... 310/68 D (Continued)

OTHER PUBLICATIONS

International Search Report mailed Dec. 10, 2001 for PCT Application No. PCT/EP01/04586.

(Continued)

*Primary Examiner*—Frank Vanaman
(74) *Attorney, Agent, or Firm*—Ostrolenk, Faber, Gerb & Soffen, LLP

(57) ABSTRACT

The invention relates to a shaft drive unit, in particular an electrical drive unit for driving a wheel shaft in vehicles; having an electrical machine comprising a rotor and a stator; having a transmission unit, comprising at least one input connected in a rotationally fixed manner to the rotor of the electrical machine, and at least one output connected in a rotationally fixed manner to the wheel shaft. The electrical machine, the input and the output of the transmission unit and the wheel shaft are arranged coaxially with respect to one another. The electrical machine has at least one associated converter unit and one associated braking resistor unit. The converter unit forms a physical unit with the electrical machine. The braking resistor unit is arranged in the immediate physical vicinity of the electrical machine and around the circumference of the input or output drive shaft of the electrical machine or of the wheel shaft.

15 Claims, 3 Drawing Sheets

U.S. PATENT DOCUMENTS

| | | | |
|---|---|---|---|
| 3,925,695 A * | 12/1975 | Raby | 310/68 D |
| 3,961,212 A * | 6/1976 | McAdams, Jr. | 310/68 R |
| 4,059,778 A * | 11/1977 | Sohnle | 310/68 D |
| 4,330,045 A * | 5/1982 | Myers | 180/65.5 |
| 4,930,590 A * | 6/1990 | Love et al. | 180/65.5 |
| 5,517,401 A * | 5/1996 | Kinoshita et al. | 363/98 |
| 5,557,181 A * | 9/1996 | Naito et al. | 318/376 |
| 5,659,235 A | 8/1997 | Yamada et al. | 318/801 |
| 5,672,135 A | 9/1997 | Hamada | |
| 5,823,280 A * | 10/1998 | Lateur et al. | 180/65.2 |
| 5,950,752 A * | 9/1999 | Lyons | 180/65.2 |
| 6,081,086 A * | 6/2000 | Roth-Stielow et al. | 318/375 |
| 6,175,171 B1 * | 1/2001 | Rupp et al. | 310/52 |
| 6,181,033 B1 * | 1/2001 | Wright | 310/67 R |
| 6,359,353 B1 * | 3/2002 | Bevington | 310/72 |
| 6,404,082 B1 * | 6/2002 | Rasinski et al. | 310/68 D |

OTHER PUBLICATIONS

*A Modified C-Dump Converter for Variable-Reluctance Machines*, IEEE Transactions on Industry Applications, vol. 28, No. 5, Sep./Oct. 1992.

* cited by examiner

US 7,216,732 B2

SHAFT DRIVE UNIT, IN PARTICULAR AN ELECTRICAL DRIVE UNIT FOR DRIVING A WHEEL SHAFT WITH A TRANSVERSE SHAFT STRUCTURE

The invention relates to a shaft drive unit, in particular an electrical drive unit for driving a wheel shaft with a transverse shaft structure.

BACKGROUND INFORMATION

A large number of embodiments are known for the design configuration and construction of electrical drives for vehicles, in particular hybrid drives for vehicles. Embodiments for driving a front wheel shaft of a vehicle are in this case preferably designed using a transverse shaft structure. The shaft drive unit in this case comprises an electrical drive machine which can be operated as an electric motor in the traction mode and is connected to the wheel shaft via a transmission unit. The power for operating the electrical drive machine is provided via a power supply system which, depending on the choice of energy source, may have various configurations. Referring to FIG. 1, there is seen a power system in the form of an internal combustion engine 100 mechanically and electrically coupled to an electrical machine 1 according to the present invention via a mechanical connection 105, and a fuel cell 110 electrically connected to the electrical machine 1 via electrical connection 115. It is in this case feasible for the power source to be in the form of an internal combustion engine an energy storage unit or what is referred to as a fuel cell. In each case, means are required for transmitting the power to the electrical drive machine. In order to control the electrical drive machine, it has at least one converter unit associated with it, which converter units determine the magnitude of the torque and rotation speed which can be delivered from the rotor of the electrical drive machine.

In embodiments with a transverse shaft structure, the rotor of the electrical drive machine is connected in a rotationally fixed manner to an input (when considered in the power flow direction in the traction mode) of the transmission unit. The output from the transmission unit is coupled in a rotationally fixed manner to the wheel shaft.

The expression wheel shaft in this case relates to the coupling to the wheels, which are connected in a rotationally fixed manner to that shaft, so that there is no relative movement between the wheels and the wheel shaft. However, with regard to power transmission, the wheel shaft acts as an input drive shaft for the wheels, which are coupled in a rotationally fixed manner to it. However, the expression wheel shaft is used in the following text. The input drive to and the output drive from the transmission unit as well as the rotor of the electrical drive machine and the wheel shaft are arranged coaxially with respect to one another. Specifically, this means that, for example, the rotor of the electrical machine and the input to drive to the transmission unit enclose the wheel shaft.

At least one converter unit is provided in order to drive the electrical machine, and can be arranged at any desired distance from the electrical machine, within the vehicle. The coupling is in this case provided via appropriately shielded electrical cables. In order to ensure reliable operation, cooling water lines must then also be provided, in addition to the electrical cables, between the converter units, in order to provide a separate cooling circuit. Owing to the physical separation, the line and cable routing required for this purpose is generally also very expensive and complicated.

Furthermore, long cable runs also mean an increase in the frequency-dependent effects of electrical, magnetic or electromagnetic fields on the environment, in particular on living beings and technical systems. This effect, which can be summarized by the expression electromagnetic compatibility, is defined by numerous national and international standards. Appropriate shielding must be provided in order to comply with the limit values specified in this case. However, this is independent of the line and cable routing and may differ to a very major extent from one particular application to another, in which case the EMC shielding must be implemented as an additional feature, with different boundary conditions, for each application. A further major disadvantage of these embodiments is that the reliability of the overall system decreases as the length of the cooling water lines and/or the electrical connecting cables increases, and this is due, inter alia, to the larger area on which insulation damage can occur on electrical cables, and over which leakages can occur in the cooling circuit.

By analogy, this statement also applies to the association of braking resistor units with the electrical drive machine, with these braking resistor units converting the electrical power to thermal energy in the generator mode. In this case as well, there is a requirement for these braking resistor units to be integrated in the drive system in an optimum manner. Since they are electrically coupled to the electrical machine, the same problems as those which occur in the arrangement of the converter units exist in embodiments where considerable physical distances are involved.

SUMMARY OF THE INVENTION

The invention is thus based on the object of further developing an embodiment of a shaft drive unit, in particular of an electrical drive unit, for driving wheel shafts of a vehicle in such a manner as to achieve optimum utilization of physical space by the components which can be associated with the electrical drive machine, while at the same time ensuring freedom from disturbance with regard to the other components required for the method of operation of the vehicle. In this case, these additional components are intended to be arranged in a simple manner, and to be as independent as possible with regard to the configuration of the vehicle. The cable connections required for electrical coupling between the electrical machine and the braking resistor unit, and between the electrical machine and the converter unit, are intended to be reduce to a minimum and, furthermore, the [lacuna] for a cooling system for cooling the cables and for transporting the heat produced in the braking resistor unit to be kept as low as possible.

The solution according to the invention is characterized by the features of claim 1. Advantageous refinements are specified in the dependent claims.

The shaft drive unit, in particular the electrical drive unit for driving a wheel shaft of a vehicle, comprises at least one electrical drive machine with at least one rotor and one stator, and a transmission unit which is connected between the electrical drive machine and the wheel shaft, when considered in the power flow direction in the traction mode. The rotor of the electrical drive machine is connected at least indirectly in a rotationally fixed manner to an input of the transmission unit, which is also referred to as an input drive, that is to say it is coupled either directly or with the interposition of further power-transmitting elements. One output of the transmission unit, which is also referred to as the output drive, is connected at least indirectly in a rotationally fixed manner to the wheel shaft. This means that the rotationally fixed connection is produced either directly from the output drive from the transmission unit to the wheel shaft, or else with the interposition of further power transmitting elements. The rotor of the electrical machine, the input drive to the transmission unit, the output drive from the transmission unit and the wheel shaft are arranged coaxially with respect to one another. In order to drive the electrical machine, it has at least one associated converter unit. The electrical machine has an associated braking resistor unit, in order to convert the electrical energy produced in it during generator operation into thermal energy. According to the invention, the electrical drive machine forms a physical unit with the converter unit, while the braking resistor unit is arranged around the input or output drive shaft of the electrical machine or the wheel shaft, in particular its circumference. The definition input or output drive shaft in this case always relates to the direction of the power flow in the motor and generator mode of the electrical machine. This expression in this case does not necessarily cover only elements in the form of shaft ends, but also includes the rotating elements which can carry out the function of the input or output drive shaft.

The solution according to the invention allows a shaft drive unit to be provided which is configured for optimum utilization especially with regard to the available physical space. The available physical space, which need not be made available for other power-transmitting elements, is generally utilized in this case. This solution makes it possible to integrate at least one braking resistor unit in the drive train in the vehicle with as little complexity as possible, irrespective of the given installation conditions, in an area which is generally not used. In this area between the wheel shaft and the electrical machine, which acts as a drive motor in the traction mode, there is also no need to be concerned about obstructions to the operation of other elements relating to the implementation of the functionality of the vehicle. The connection lines required for electrical coupling can in this case be kept very short. The EMC shielding can be implemented jointly for the entire unit comprising the electrical machine, which acts as the drive motor in the traction mode, and the braking resistor unit. This also applies to the additional integration of the converter unit in the electrical machine. Furthermore, it is possible to produce the totality of the electrical machine, which acts as a drive motor in the traction mode, together with the braking resistor unit and the converter unit as a prefabricated unit, and to offer them in this form. Integration in drive systems is thus cost-effectively possible in a very simple manner irrespective of the options for attachment of these additional functional elements to the vehicle frame or other elements.

The arrangement options or integration options for the converter unit and braking resistor unit will be considered separately, in their own right, in the following text. The braking resistor unit is arranged on the housing of the electrical machine, which acts as a drive motor. There are a wide range of options for the coupling to the housing. This is preferably done mechanically by flange-connection of the braking resistor unit to the housing. However, it is also feasible if the electrical coupling option between the braking resistor unit and the electric motor is configured appropriately, for example in the form of an electrical plug connection, to use these means for attachment as well. However, in this case it necessary for the electrical machine to be configured appropriately with respect to the means for electrical coupling.

Each electrical machine which acts as a drive motor has either one or more associated braking resistor units. Depending on the design configuration of the braking resistor unit, this unit is, in one embodiment, arranged grouped with a number of braking resistor units in an annular shape around the input or output drive shaft of the electrical machine which acts as a drive motor or, alternatively, they are arranged alongside one another in the axial direction, when viewed with the drive system in the installed position.

One advantage of the former case is that, in terms of their geometrical configuration, conventionally designed braking resistor units can be integrated individually or jointly in the drive train in the manner according to the invention.

However, it is preferable to choose a configuration for the electrical braking resistor unit which is suitable for at least partially enclosing the input or output drive shaft, with an annular configuration of the braking resistor unit preferably being desirable. The braking resistor unit can then be arranged coaxially with respect to the input or output drive shaft of the electrical machine which acts as a drive motor. This arrangement option represents the best variant with regard to provision of the connecting elements and the required physical space.

For the situation where a number of braking resistor units are required, these are likewise preferably configured in an annular shape and are of modular construction such that, when viewed in the installed position, they are arranged alongside one another in the axial direction and coaxially with respect to the input or output drive shaft of the electrical machine, which acts as a drive motor. The individual resistor units are most easily coupled to one another in this case via interlocking and force-fitting connections.

In the annular configuration of the braking resistor unit, it is necessary to ensure that the internal diameter of the braking resistor unit is designed such that it is possible for it to enclose the input or output drive shaft of the electrical machine, which acts as a drive motor. Depending on the dimensions in the axial direction, that is to say the extent of the braking resistor unit away from the housing wall of the electrical machine, it is possible for the braking resistor unit to enclose not only the input or output drive shaft of the electrical machine which acts as a drive motor, but also the coupling to the shaft train which may be connected to it, or to some other transmission element. The coupling between the input or output drive shaft of the electrical machine and the shaft train or some other element for power transmission, for example a rotation speed/torque conversion or transmission device, can be designed in a wide range of ways. In the simplest case, both

- the shaft train or rotation speed/torque conversion or transmission device, in particular their connecting shaft, and
- the input or output drive shaft of the electrical machine each have a flange-like end region, in which case the two flange-like end regions can be coupled to one another with an interlock and/or force fit. However, configurations with coupling or clutch devices are also feasible.

The solution according to the invention for drive systems with at least one electrical machine which can be operated as a motor and generator and can be coupled via a shaft train at least indirectly to at least one wheel which can be driven can be used, irrespective of the nature of the power supply which is used in the traction mode and determines the nature of the drive system. Integration is thus possible in a) diesel-electric drive systems,
b) drive systems with a fuel cell drive,
c) drive systems with an external electrical power supply, for example from an overhead line.

In the first-mentioned case, an internal combustion engine acts as an energy source and can be mechanically coupled to an electrical machine which can be operated as a generator in the traction mode. The electrical machine which can be operated as a generator can be electrically coupled to the electrical machine which acts as a drive motor. The electrical coupling is provided via a voltage intermediate circuit. The electrical machine which can be operated as a generator and the electrical machine which acts as a drive motor in the traction mode have associated devices (which are appropriate for controlling the electrical power which can be produced or consumed) in the form of converters, which may be controllable.

In the case of the second option, mentioned at b) chemical energy is converted to electrical energy via a fuel cell unit, and can be used for supplying the electrical machine which acts as a drive motor.

In the case of the energy source mentioned at c) electrical power is provided from an external network, which is used for supplying the electrical machine which acts as a drive motor.

There are a wide range of options for the specific design implementation of the overall drive system, and these are within the abilities of a responsible person skilled in the art, in accordance with the operational requirements.

The combination of the electrical machine and converter unit to form a physical unit may likewise be carried out in a different way. In this context, the expression physical unit means a combination of the electrical machine and of the converter unit which is associated with it, and is distinguished in that, from the physical point of view, there is no physical separation, that is to say the converter unit is arranged in the region of the electrical machine, in particular in its housing, and touches it, irrespective of the connecting cables which may be required for the electrical coupling. The components associated with the converter unit are generally combined in one housing. An electrical coupling to the electrical machine can be provided via appropriate connections. For this purpose, the converter unit has appropriate means preferably in the form of screw connections. A physical unit may be formed from an electrical machine and an associated converter unit in various ways. The essential feature is that there is always an electrical coupling. In addition, it is possible to connect the converter unit mechanically to the electrical machine. The following variants are feasible for providing the coupling:

interlocking,
force-fitting,
integral material connection.

The specific embodiment may include a combination of these coupling options. In the simplest case the mechanical coupling between the converter unit and the electrical machine associated with it is provided via the means for electrical coupling. In this case, the means for mechanical coupling are formed together with the means for electrical coupling by the same component, or the same components. This means, for example, that the provision of an electrical screw connection at the same time allows mechanical coupling between the electrical machine and the converter unit associated with it. In this case, the corresponding arrangement of the converter unit and the configuration of the electrical coupling allow the converter unit to be supported on the electrical machine.

Furthermore, it is possible to associate the means for electrical coupling and the means for providing the mechanical coupling with different components. In the simplest case, the mechanical coupling is for this purpose provided via means which allow coupling between the housing of the converter unit and the housing or some other supporting element for the electrical machine. These may be interlocking, force-fitting and/or formed by an integral material connection. This offers the advantage of a fixed association between the converter unit and the electrical machine, in which case the entire unit comprising the electrical machine and converter unit can be offered preassembled as a module, and in a form which can be handled on its own.

A detachable connection is preferably used. This offers the advantage of simple replacement in the event of defects and/or when adaptation is desired to other boundary conditions which require the use of a different type of converter unit.

The converter units themselves can in this case be in the form of inverter units of different types. In the simplest case, a converter unit comprises at least one diode rectifier device. This may in turn have arms in which a number of diodes are connected in parallel and/or in series. In this case, diodes of the same type are preferably used. Reference should be made to the known relevant specialist literature for further options relating to the configurations of converter units, in particular inverter units.

Depending on the configuration of the electrical machine, the embodiment and the number of braking resistor units, there are various options for the specific arrangement of the converter unit and of the braking resistor units on the electrical machine. If the braking resistor units are arranged eccentrically on one of the end surfaces of the electrical machine, it is feasible for the converter unit likewise to be integrated in the area of this end surface such that the converter unit is likewise provided on the circumference of the wheel shaft or the input or output drive shaft of the electrical machine. Otherwise, it is possible, depending on the coupling and arrangement of the electrical machine and transmission unit with respect to one another, to integrate the converter unit, or the combination of the electrical machine and converter unit, at any desired point in the region of the external circumference. In the case of configurations with a transverse shaft construction, the transmission unit and the electrical machine are preferably arranged physically immediately adjacent to one another. In this case, the housings of the two units—the transmission unit and the electrical machine—are preferably flange-connected to one another. In this case, at least the braking resistor unit is arranged on that end surface of the electrical machine which faces away from the transmission unit. If sufficient physical space is still available, the converter unit is likewise arranged either on the end surface or on the circumference of the electrical machine. However, if it is arranged on the circumference, an embodiment is chosen which, in the installed position, is characterized in that the converter unit is arranged in front of or behind the electrical machine, in a side view of the vehicle.

BRIEF DESCRIPTION OF THE DRAWINGS

The solution according to the invention will be explained in the following text with reference to figures in which, in detail.

DETAILED DESCRIPTION

Figure 1:
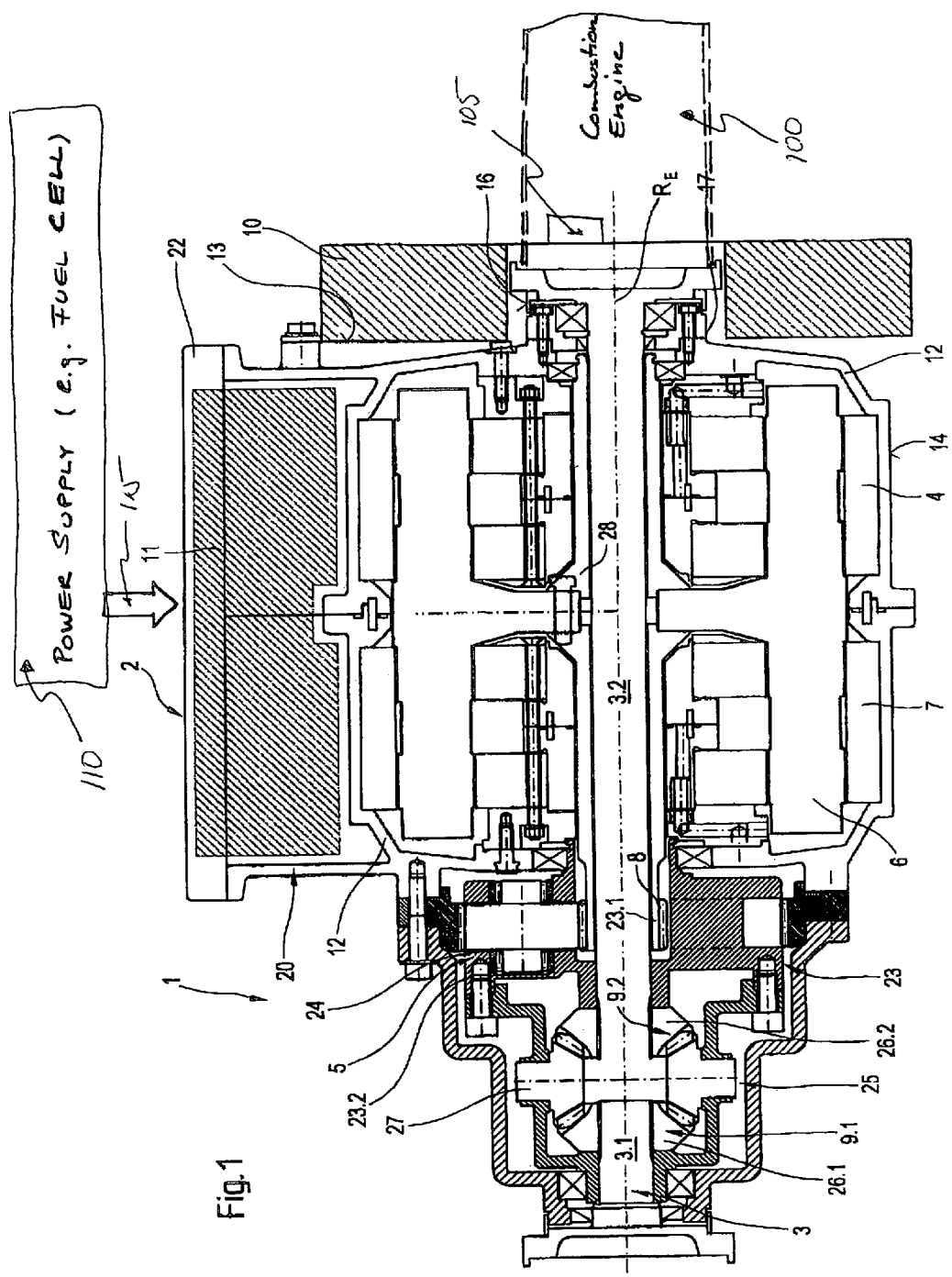
FIG. 1 shows, in a simplified form using a section illustration, one preferred embodiment of a shaft drive designed according to the invention.

FIG. 1 uses an axial section to show the basic design of a shaft drive unit 1 designed according to the invention, in particular in the form of an electrical drive unit 2 for driving a wheel shaft 3 with a transverse shaft structure. The shaft drive unit 1 comprises at least one electrical machine 4, which acts as a drive motor in the traction mode, in particular an electric motor and a transmission unit 5 coupled to it. The transmission unit 5 is in this case arranged between the electrical machine 4 and the wheel shaft 3 which is to be driven. The expression wheel shaft is in this case chosen with respect to the wheels since the wheel shaft can be coupled in a rotationally fixed manner to the wheels, that is to say there is no relative movement between the wheel and the shaft. However, with respect to its operation, this acts as an input drive shaft. The electrical machine 4 has at least one rotor 6 and one stator 7, with the rotor 6 being connected in a rotationally fixed manner to an input 8 of the transmission unit 5, when viewed in the power flow direction in the traction mode. This input 8 acts as an input drive for the transmission unit 5, when viewed in the power flow direction in the traction mode.

The electrical machine 4 is preferably in the form of a transverse flux machine. This allows a high power density with a small physical height, and is thus optimally suitable for use in a motor vehicle. The transmission unit 5 furthermore has at least one output 9 which, when viewed in the power flow direction in the traction mode, acts as an output drive from the transmission unit 5 and is connected at least indirectly in a rotationally fixed manner to the wheel shaft 3. In detail, this means that the output 9, that is to say the output drive from the transmission unit 5, is either connected directly in a rotationally fixed manner to the wheel shaft 3, or else further power transmission elements are connected inbetween. In the illustrated case, the transmission unit 5 has a differential 25, which is coupled to one output 24 of the epicyclic gear stage 23, in addition to the epicyclic gear stage 23 itself. The input 8 of the transmission unit 5 is in this case formed by the sun wheel 23.1 of the epicyclic gear stage 23. The web 23.2 acts as an output 24, and is connected to an input 27 of the differential 25. The differential 25 has two outputs 26.1 and 26.2, which at the same time form the outputs 9.1 and 9.2 of the transmission unit 5, and are coupled in a rotationally fixed manner to the wheel shaft, in particular to the individual wheel shaft parts 3.1 and 3.2, which are each connected in a rotationally fixed manner to one wheel.

In the case of the transverse shaft structure, at least the rotor 6 of the electrical machine 4—the input drive 8 of the transmission unit 5, the output drive or drives 9.1 and 9.2 of the transmission unit 5 and the wheel shaft 3 or the wheel shaft parts 3.1 and 3.2—are arranged coaxially with respect to one another. The transmission unit 5 is preferably arranged coaxially with respect to the wheel shaft 3. However, configurations are also feasible in which the transmission unit has a design which is substantially asymmetric with respect to the wheel shaft 3.

In order to convert the electrical power (which has a "braking" function over at least a part of the operating range) produced in the generator mode by the electrical machine 4, which acts as a wheel drive motor in the traction mode, into thermal energy for different applications, the electrical machine 4 has at least one associated braking resistor unit 10. This braking resistor unit 10 is arranged on the electrical machine 4, and is preferably designed such that it can be flange-connected to it. Furthermore, the electrical drive machine 4 has at least one associated converter unit 11 for drive purposes, in particular in order to influence the rotation speed/torque conversion. In addition, according to the invention, the converter unit 11 is either arranged directly on the electrical machine 4 or is integrated in it, and hence, together with this electrical machine, forms a physical unit 20.

In the illustrated embodiment, the braking resistor unit 10 on the housing 12 of the electrical machine 4 is arranged on that end face 13 of the housing 12 which faces away from the transmission unit 5. In this case, the arrangement in the radial direction is produced with respect to the rotation axis $R_E$ of the electrical machine 4, preferably in a region between the rotation axis $R_E$ and the external circumference 14 of the housing 12 of the electrical machine. An extent considerably beyond the external circumference 14 in the radial direction is likewise feasible. However, it is preferable to aim for configurations which do not, or do not significantly, go beyond the region defined in the height direction by the dimensions of the electrical machine and the transmission unit 5. The braking resistor unit 10 is in this case arranged around the circumference of the input drive or output drive shaft 28 of the electrical machine 4 or of the wheel shaft 3. In this embodiment, physical space which exists in any case but cannot be used for other power-transmitting elements is used in an ideal manner for accommodation of power elements. The braking resistor unit 10 can be electrically coupled to the electrical machine 4. The definition of the input or output drive shaft of the electrical machine 4 is in this case always considered in the direction of the power flow in the motor and generator mode. This expression does not in this case necessarily mean only elements in the form of shaft ends, but also rotating elements which can carry out the function of the input or output drives. This solution, in conjunction with a drive unit with a transverse shaft structure, allows the braking resistor unit 10 to be integrated with little complexity and independently of the given installation conditions in the vehicle, in an area of the drive train which previously had no purpose whatsoever. In this area between the electrical machine 4, which acts as a wheel-drive motor, and the wheel shaft, there is also no need to be concerned about any obstructions to the operation of other elements for providing the functionality of the vehicle. The cable connection or cable connections required for electrical coupling can be kept very short. The EMC shielding can be provided jointly for the entire unit comprising the electrical machine 4, which acts as a drive motor in the traction mode, and the braking resistor unit 10.

There are a large number of options for the coupling to the housing 12. This is preferably done mechanically by flange-connection of the braking resistor unit 10 to the housing 12. However, it is also feasible, if the electrical coupling option between the braking resistor unit 10 and the electrical machine 4 is configured appropriately, for example in the form of an electrical plug connection, to use these means for attachment as well. This is dependent on the electrical machine 4, which acts as a drive motor, being configured in an appropriate manner with respect to the means for electrical coupling.

Figure 2A:
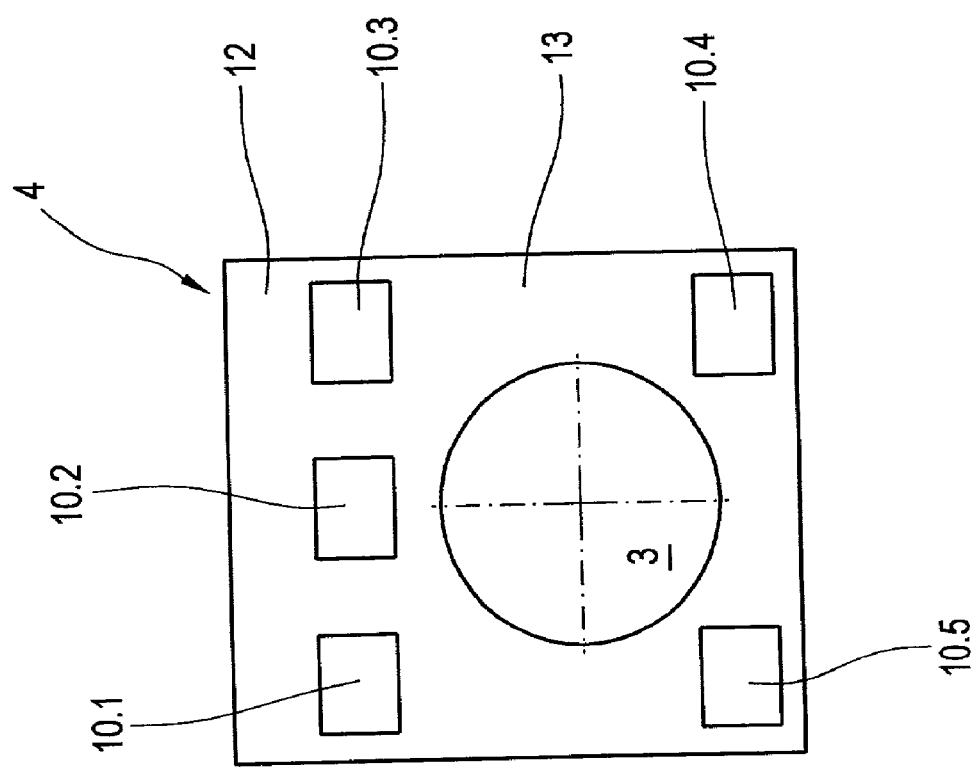
FIGS. 2a and 2b show alternative embodiment and arrangement options, compared to one another, for braking resistor units.
Figure 2B:
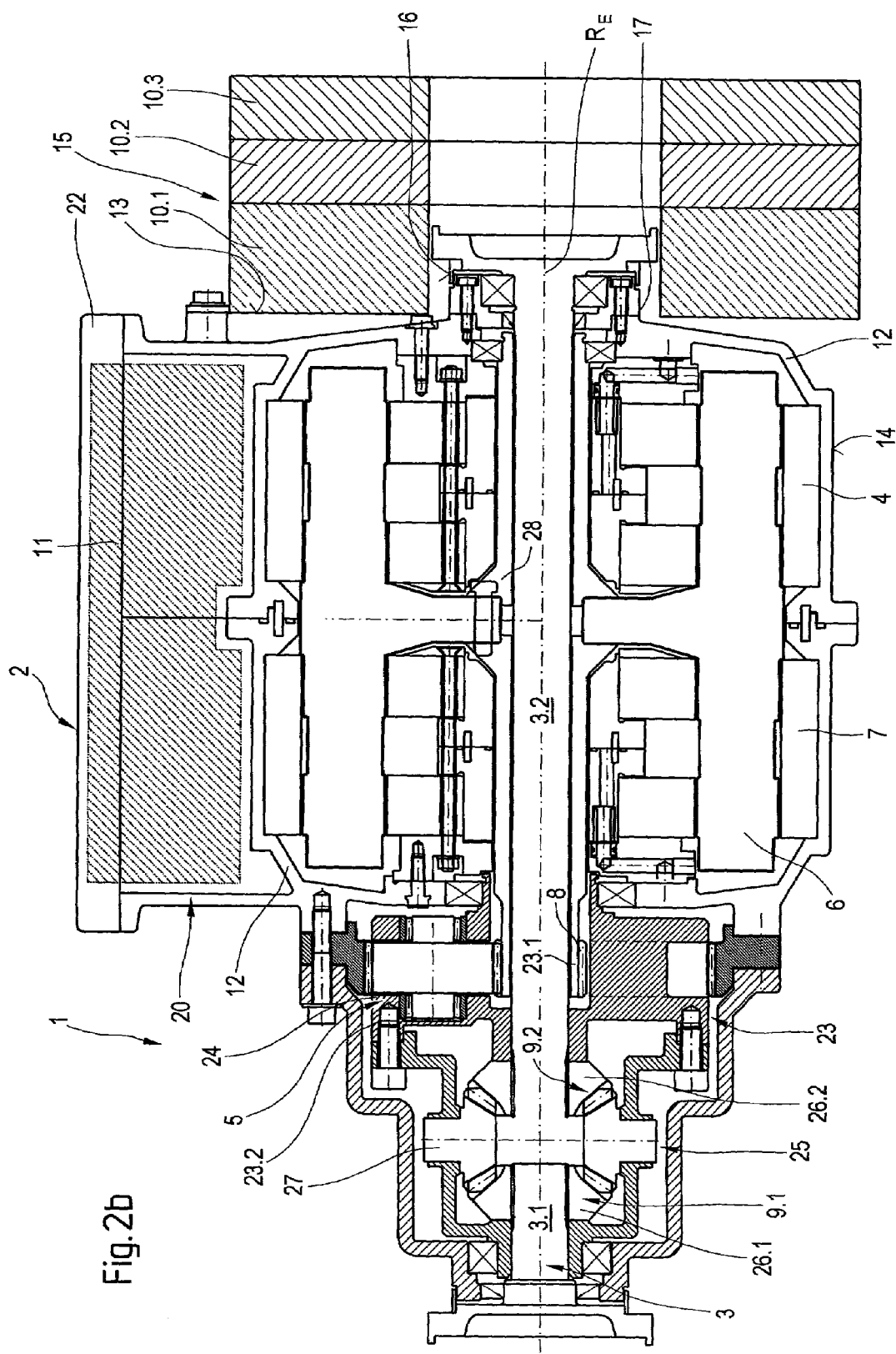

Each electrical machine 4 which acts as a drive motor has at least one associated braking resistor unit, and preferably a number of such braking resistor units 10.1 to 10.n. Depending on the design configuration of the braking resistor unit 10 or units 10.1 to 10.n, it or they are arranged, in one embodiment, with a number of braking resistor units 10.1 to 10.n either in an annular shape one behind the other around the circumference of the wheel shaft 3 as shown in FIG. 2a, or else in each case around the circumference of the wheel shaft, viewed in the axial direction when the shaft drive unit 1 is in the installed position, but arranged alongside one another. This embodiment is shown in a view from the side according to FIG. 1 in FIG. 2b, but illustrated in a considerably simplified form. The individual resistor units 10.1 to 10.n are in this case preferably combined to form a physical unit 15, which is flange-connected to the end surface 13 of the electrical machine 4. In this case, they are attached by means of interlocking and/or force-fitting connections. The individual braking resistor units 10.1 to 10.n are preferably designed identically in terms of their design configuration and dimensions. Their dimensions in the radial direction are preferably designed such that they do not extend beyond a size which corresponds to the size of the external circumference 15 of the electrical machine 4. The radial extent is preferably in the region between the external circumference 16 of the wheel shaft, or of a part 17 of the housing 12 of the electrical machine 4 which loops around it, and the external circumference 14 of the electrical machine 4. In both the embodiments illustrated in FIGS. 2a and 2b, the end surface 13 of the housing 12 is free of the arrangement of the converter unit 11. This is associated with the electrical drive machine 4 in another region of its external circumference on the housing 12. When viewed in the installed position in the vehicle, it is preferably arranged in front of or behind the electrical machine 4, in a side view. A configuration such as this is shown in FIG. 2b.

Another arrangement option, which is not shown here, for the braking resistor unit and/or the converter unit 11 if the electrical drive machine 4 and the transmission unit 5 have considerably different dimensions in the radial direction is to arrange them on the end face, which faces the transmission unit, above the transmission unit. However, in one particularly advantageous refinement, the converter unit 11 and the electrical machine 4 form a physical unit. There are a wide range of options for the design configuration of the combination of the electrical machine 4 and the converter unit 11 to form a physical unit 20. In particular, the specific configuration of the electrical coupling and of any additional mechanical coupling between the converter unit 11 and the electrical machine 4 are within the knowledge of a person skilled in the art in this case and are carried out depending on the application and the characteristics of the standardized elements that are used. The unit 20 is in this case provided at least by the electrical coupling between the converter unit 11 and the electrical machine 4. For this purpose, the electrical machine has four connections 21, which are not shown in detail here but which, when coupled, are operatively connected to respectively complementary connections on the converter unit 11 associated with them. In a corresponding way to the arrangement of the converter unit 11 on the electrical machine 4, it is possible to fix the converter unit 11 on the electrical machine 4 just by the means for providing the electrical coupling between the converter unit 11 and the electrical machine 4. The means for electrical coupling, which comprise mutually complementary connection elements, then at the same time form the means for the mechanical connection between the converter unit 11 and the electrical machine 4. Furthermore, configurations which are not described in detail here are feasible, in which means are provided for additional mechanical coupling between the converter unit 11 and the electrical machine 4. In the simplest case, this is provided by an additional attachment of the converter unit 11, for example of the housing 22 of the converter unit, to the electrical machine 4. The specific configuration of the coupling is in this case within the knowledge of a person skilled in the art and, in detail, depends on the converter units provided for that application, in particular their dimensions and weight and the arrangement on the associated electrical equipment.

The solution according to the invention can be used particularly advantageously in a shaft drive configuration for use in vehicles, in particular passenger vehicles, with the electrical machine 4 preferably being in the form of a transverse flux machine, that is to say an alternating current machine with transverse flux guidance.

| | |
|---|---|
| 1 | Shaft drive unit |
| 2 | Electrical drive unit for driving a wheel shaft with a transverse shaft structure |
| 3, 3.1, 3.2 | Wheel shaft |
| 4 | Electrical machine which acts as a drive machine in the traction mode |
| 5 | Transmission unit |
| 6 | Rotor |
| 7 | Stator |
| 8 | Input to the transmission unit |
| 9.1, 9.2 | Output from the transmission unit |
| 10 | Braking resistor unit |
| 11 | Converter unit |
| 12 | Housing |
| 13 | End surface |
| 14 | External circumference |
| 15 | Physical unit |
| 16 | External circumference of the wheel shaft |
| 17 | Part, enclosing the wheel shaft, on the housing 12 |
| 20 | Unit |
| 21 | Connections |
| 22 | Connecting elements |
| 23 | Epicyclic gear stage |
| 24 | Output |
| 25 | Differential |
| 26.1, 26.2 | Output, differential |
| 27 | Input, differential |
| 28 | Input or output drive shaft of the electrical machine |

The invention claimed is:

1. An electrical drive unit for a wheel shaft of a vehicle, comprising:

an electrical machine comprising a radially outwardly disposed stator, a rotor radially inwardly of the stator and rotatable with respect to the stator and a drive shaft extending therethrough the machine, the rotor having an associated torque and an associated speed when driven;

a transmission unit having at least one input connectable in a rotationally fixed manner to the rotor and having at least one output connectable in a rotationally fixed manner to the wheel shaft such that rotation of the rotor rotates the wheel shaft through the transmission unit;

all of the electrical machine, including the stator, the rotor, the input and the output of the transmission unit and the wheel shaft being coaxial;

at least one power control unit operable to control at least one of speed and torque of the rotor the power control unit being combined with and attached to the electrical machine to form a physical combination therewith;

a plurality of braking resistor units arranged in the vicinity of the electrical machine for converting electrical power of the electrical machine into thermal energy when the motor operates in a generator mode to brake the wheel shaft, the braking resistor units being disposed coaxially with the wheel shaft around the circumference of at least one of the input or the output of the transmission unit or the wheel shaft in a plane in an annular shape.

2. The shaft drive unit of claim 1, further comprising a mechanical connection between the power control unit and the electrical machine.

3. The shaft drive unit of claim 2, wherein the power control unit is both mechanically and electrically coupled to the electrical machine.

4. The shaft drive unit of claim 2, further comprising connector elements for mechanically connecting the electrical machine and the power control unit and the connector elements being mutually complementary for enabling a force fitted connection between them.

5. The shaft drive unit of claim 1, wherein the electrical machine has a housing around it with an external circumference, and the power control unit is arranged on the external circumference of the housing of the electrical drive machine.

6. The shaft drive unit of claim 1, wherein the electrical drive machine has opposite end surfaces and the power control unit is arranged on one of the end surfaces of the electrical drive machine.

7. The shaft drive unit of claim 1, the braking resistor units each have a respective geometrical structure in a circumferential direction of the drive shaft of the electrical machine or of the wheel shaft for at least partially enclosing the drive shaft of the electrical machine.

8. The shaft drive unit of claim 1, wherein each of the braking resistor units has an annular shape.

9. The shaft drive unit of claim 8 wherein there are a plurality of the braking resistor units arranged alongside one another.

10. The shaft drive unit of claim 1, wherein the plurality of braking resistor units are arranged alongside one another; the braking resistor units are each of modular construction and are adapted to be mechanically and electrically coupled to one another.

11. The shaft drive unit of claim 1, wherein the electrical machine is a transverse flux machine.

12. A drive system, comprising:
a shaft drive unit as claimed in claim 1; and
a power supply system for the drive shaft unit.

13. The drive system of claim 12, wherein the power supply system comprises a fuel cell electrically connected to the electrical machine.

14. The drive system of claim 12, wherein the power supply system comprises an internal combustion engine;
the electrical machine being mechanically coupled to the internal combustion engine and can be operated as a generator in a traction mode; and
an electrical coupling connecting the power supply system to the electrical machine for the shaft drive unit.

15. An electrical drive unit for a wheel shaft of a vehicle, comprising:
an electrical machine comprising a radially outwardly disposed stator, a rotor radially inwardly of the stator and rotatable with respect to the stator and a drive shaft extending therethrough the machine, the rotor having an associated torque and an associated speed when driven;
a transmission unit having at least one input connectable in a rotationally fixed manner to the rotor and having at least one output connectable in a rotationally fixed manner to the wheel shaft such that rotation of the rotor rotates the wheel shaft through the transmission unit;
all of the electrical machine, including the stator, the rotor, the input and the output of the transmission unit and the wheel shaft being coaxial;
at least one power control unit operable to control at least one of speed and torque of the rotor the power control unit being combined with and attached to the electrical machine to form a physical combination therewith;
a plurality of braking resistor units arranged in a rotationally fixed relationship to a housing of the electrical machine in the vicinity of the electrical machine for converting electrical power of the electrical machine into thermal energy to brake the wheel shaft,
the braking resistor units being disposed coaxially with the wheel shaft around the circumference of at least one of the input or the output of the transmission unit or the wheel shaft in a plane in an annular shape.

* * * * *